Oct. 18, 1966    Y. J. TALBOT    3,279,735
OUTSIDE REAR-VIEW MIRROR FOR MOTOR VEHICLES
Filed July 20, 1964    2 Sheets-Sheet 1
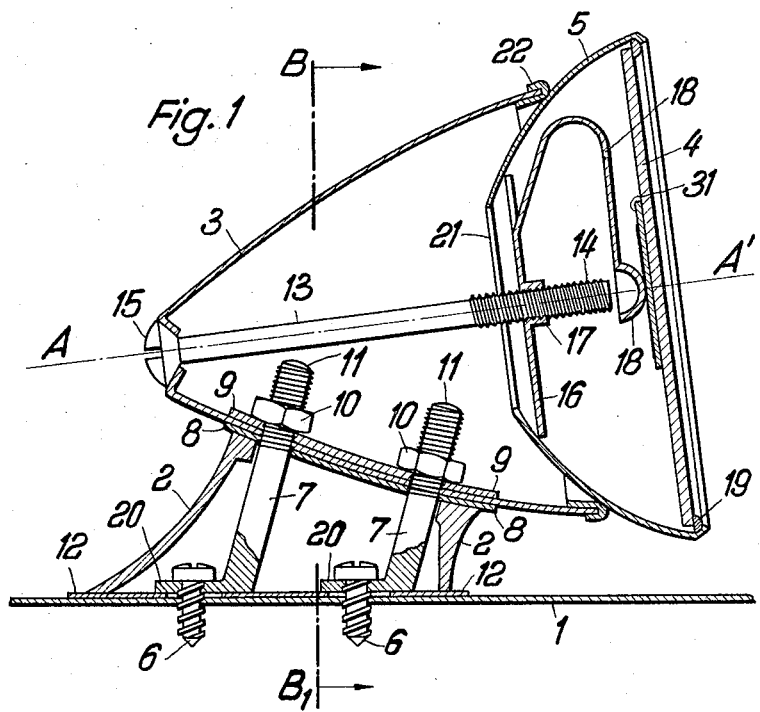
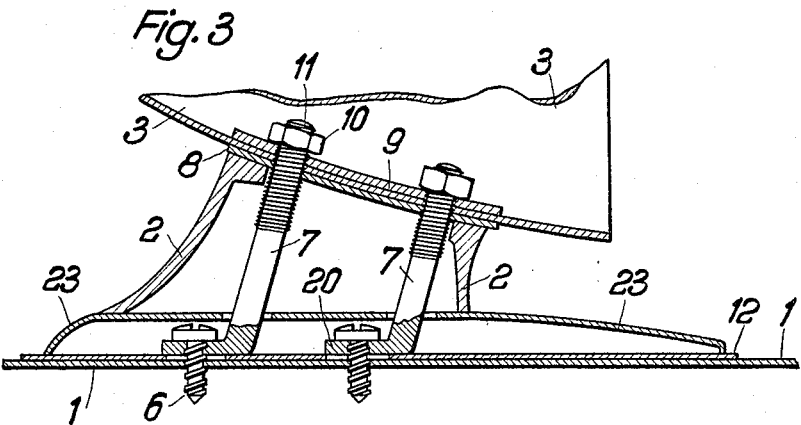
Inventor:
Yoseph Joachim Talbot
by Michael J. Striker
Attorney

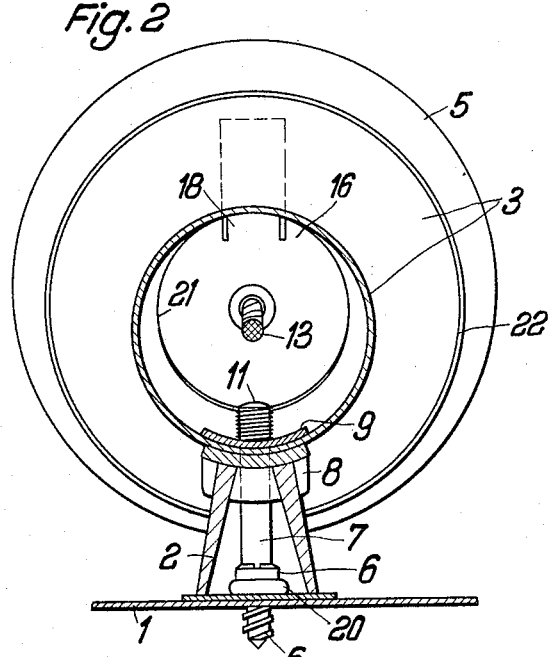
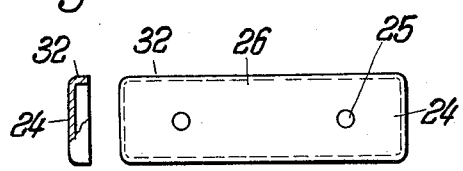
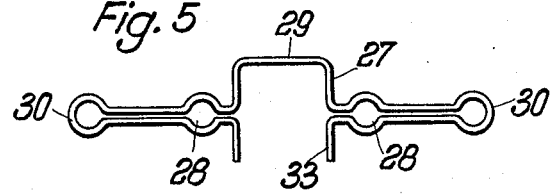

United States Patent Office 3,279,735
Patented Oct. 18, 1966

3,279,735
OUTSIDE REAR-VIEW MIRROR FOR MOTOR VEHICLES
Yorck Joachim Talbot, Ebersstrasse 80, Berlin, Germany
Filed July 20, 1964, Ser. No. 383,571
Claims priority, application Germany, Sept. 6, 1963,
T 24,657
8 Claims. (Cl. 248—205)

The invention relates to an outside rear-view mirror for motor vehicles.

The outside rear-view mirrors hitherto known consist mainly of a supporting-foot resting on the vehicle body, of an approximately conical housing supported by the foot, and of a mirror-head part rigidly or movably connected with the housing. The movable mirror-head connected with the housing takes the form of a hollow calotte with a sufficiently large boring containing a sheet-metal disc screwed or riveted to a threaded rod situated in the housing. Onto the free end of this threaded rod is screwed a female screw, which rests in the tip of the housing and can be tightened up from outside and by which the mirror-head can be held in the desired position in relation to the housing.

The housing, the foot and the vehicle body can be interconnected in various ways.

A common feature of all known methods of affixing the outside rear-view mirror is that its position in relation to the longitudinal axis of the vehicle is permanently established by mounting-holes bored in the vehicle body, so that it cannot be subsequently adjusted.

In the outside rear-view mirror to which the present invention relates and which consists of an approximately conical housing, a mirror-head part mounted thereon and a hollow foot, the invention provides that the housing shall be supported by at least one screw hook, which passes through the hollow foot, and affixed to the vehicle body by at least one sheet-metal screw which is screwed onto the latter from the outside, a packing-plate being inserted between the vehicle body and the eye of the screw hook as well as the foot, and one shim plate each, with bores to give passage to the screw hook, being inserted between the foot and the housing and between the latter and the nut of the screw hook. It is also desirable for a base with a bore through which the securing-screw passes, to be provided between the foot and the side of the vehicle body. Of the shim plates resting against the outside and the inside of the wall of the housing, the inner one replaces the hitherto customary circular washers under the securing-nuts, while the outer one keeps the two screw-hooks at the correct distance from the similarly perforated housing. By appropriately increasing the dimensions and the curvature, a larger area of the outer wall of the housing can be clamped between the two shim plates at the same time, providing a very firm connection between the foot and the housing.

For preference, two screw-hooks are provided, each screwed to a plate, and serving as a gauge for the bores for the sheet-metal screws to be inserted in the side of the vehicle-body. The shim plate provided between the foot and the housing can be combined with the foot to form one single component, just as the shim plate provided inside the housing can be combined with this latter to form one component.

The way in which these securing-devices are designed offers the advantage that the wo threaded rods which take the form of perforated screw-hooks and interconnect the vehicle body, the foot and the housing, the two latter being screwed onto the vehicle body from the outside by means of two normal sheet-metal screws, can be slightly adjusted in order to regulate the position of the rear-view mirror, if the sheet-metal screws are slightly loosened. These screw-hooks enable the outside rear-view mirror to be mounted either on single-walled or on double-walled vehicle bodies without the securing-devices being visible from the outside.

The invention also provides that in order to facilitate the assembly of the housing with the hemispherical mirror-head the tip of the housing shall contain a set-screw made in one piece and projecting far beyond the rear aperture of the housing, so that it can be screwed into the internal threading of the securing-washer in the hemispherical mirror-head without the operator having to grope for the correct position.

The accompanying drawings illustrate a constructional example of the outside rear-view mirror and constructional examples of securing-devices for the present invention, and in these drawings:

FIG. 1 shows a longitudinal section through the outside rear-view mirror with a foot and with its securing-devices.

FIG. 2 shows the outside rear-view mirror with its foot, as seen from the direction of motion of the vehicle.

FIG. 3 shows, likewise in longitudinal section, a modified foot for the outside rear-view mirror according to FIG. 1, line B—B.

FIG. 4 shows a plate serving as a marking and boring gauge.

FIG. 5 shows a marking and boring gauge shaped out of spring wire.

As may be seen from FIGS. 1, 2 and 3, a hollow foot 2 with a lower edge is mounted on the side of the vehicle body, with an intermediate elastic packing-plate 12, while a shim plate 8, somewhat broader, is mounted on the upper edge of the foot, the course taken by this edge being in accordance with the housing 3, and the housing 3 resting on the said shim plate. The free ends of two bolts 7, the ends being provided with threading 11, pass through the hollow foot 2, the shim plate 8, the housing 3 and an internal shim plate 9, nuts 10 being placed on the said bolts. The lower ends 20 of the two screws 7 are flattened out at an angle and provided with holes to give passage to the two sheet-metal screws 6, which are screwed into the two holes previously bored in the vehicle body 1 by means of the boring gauge shown in FIG. 4 or 5. The internal space in the hollow foot 2 is wide enough to ensure that the two screw hooks 7 can be turned to a certain distance towards both sides, around the sheet-metal screws 6 as their axis, thus enabling the foot 2, likewise, to be swivelled to a certain distance on either side of the connecting line of the holes in the vehicle body 1. To enable the packing 12 to be moved together with the foot 2 in this process, the packing is provided with correspondingly larger holes for the sheet-metal screws 6. When the foot 2 and the housing 3 have been correctly positioned in respect of the longitudinal axis of the vehicle, the two nuts 10 are tightened up, whereupon the packing 12, the foot 2, the outer shim plate 8, the housing 3 and the inner shim plate 9 are found to be firmly and rigidly connected with one another and with the vehicle body. The open right-hand edge of the housing 3 is enclosed in an elastic profile-ring 22 and accommodate the mirror-head 5, which may take the form of a hollow calotte and in the right-hand opening of which the mirror-glass 4 is secured by means of a circlip 19. A centering disc 16 provided in the mirror-head 5 has an elastic tongue 18, of which the end 18', bent in the form of a semi-circle, rests against a protective disc 31 which presses the mirror-glass 4 against the circlip 19. If the position of the centering disc 16 inside the mirror-head 5 is altered in relation to the mirror-glass 4 and the protective disc 31, this only results in a slight change in the pressure exerted on the protective disc 31 and the mirror-glass 4.

The rigid connection of the mirror-head 5 to the housing 3 is provided by a long screw 13 of which the slotted head 15 rests in the pointed end of the housing 3 and of which the threaded end 14 projects beyond the rear edge of the housing 3 to a sufficient distance to ensure that it can be introduced through the bore 21 of the mirror-head 5, into the internal threading 17 of the centering disc 16 provided in the said mirror-head, the operator having a clear view of the parts concerned. By means of the screw 13, the mirror-head 5 is then drawn into the opening of the threaded part, at first only far enough to ensure that it can still be easily adjusted to any position desired by the driver. After the tightening-up of the screw 13 it is then firmly held in the said position.

As regards the two shim plates 8 and 9, which always preserve the correct distance between the screw hooks 7, it should also be mentioned that the outer shim plate 8 can be made in one single piece with the foot 2, and also that the internal shim plate 9 can with advantage be rigidly connected with the housing.

In FIG. 3 the housing 3 is shown divided. In this case there is also a base 23, projecting to one side or to both sides, between the hollow foot 2, and the vehicle body 1, and the packing 12 is provided underneath this base. If a base 23 is only allowed to project towards one side, the apparatus can be given a particularly aesthetic appearance by the selection of an appropriate shape. The base 23 also serves the purpose of enabling the outside rear-view mirror to be mounted, if necessary, in a somewhat higher position, to a certain distance above the vehicle body 1.

The boring gauge shown in FIG. 4 consists of a thin steel plate 24 with a surrounding edge 32 turned downwards. On the surface of the plate 24 are two borings 25, the distance between them being punched into the gauge, above them. Since the plate 24, by reason of its turned edge 32, has a certain height, even very sharply pointed boring-bits can be accurately guided over its cylindrical part during the boring-process. It is also possible for one of the two vehicle-body holes first of all to be bored "free," i.e. without the use of a boring-gauge, after which the latter is screwed on by means of a sheet-metal screw 6, the borer finally being guided all the more accurately in the free second hole 25. The plate 24 should be preferably made large enough to ensure that when the complete outside mirror is assembled at the works it cannot be drawn into the hollow foot 2 of the hollow base 23 from below when the nuts 10 are tightened-up on the screw hooks 7, which were firmly screwed in advance to the plate 24 by means of the sheet-metal screws 6.

FIG. 5 shows a different boring-end assembly-gauge, shaped from a piece of spring wire. The latter is bent in such a way that two holes 28 are formed, these having the core diameter of the sheet-metal screws 6 and firmly clamping these latter with the clamping-force produced by the bent eyes 30. The screws 6 therefore do not have to be screwed into these elastic holes 28 and need only be thrust into them. A U-shaped widening 29 on one side and two free ends bent at an angle on the other side prevent this gauge shaped from wire from slipping into the hollow foot 2 or the hollow base 23 at the assembly stage. This boring-gauge of wire can be used for the boring of the holes of the vehicle body 1 in the same manner as the sheet-metal gauge shown in FIG. 4. The boring-gauge can also be constructed as a combination of a sheet-metal part and a wire-part, or else two elastic tongues of sheet-metal, bent downwards, can be punched out of the simple sheet-metal plate 24, in place of two circular borings, the said tongues leaving an opening for the insertion of the sheet-metal screws 6 but being firmly clamped in the threads of these screws when the latter are subjected to a tractive force in the opposite direction, i.e. when the nuts 10 are tightened-up on the screw hooks 7.

I claim:

1. An outside rear-view mirror for motor vehicles, comprising an approximately conical housing, a mirror-head mounted on said housing, a hollow foot for the housing, and a screw-hook engaged with the housing and passed through the hollow foot and having an eye to receive a sheet-metal screw for attachment thereof to a vehicle body.

2. An outside rear-view mirror for motor vehicles, as claimed in claim 1, comprising a packing plate disposed below the eye of the screw-hook.

3. An outside rear-vew mirror for motor vehicles, as claimed in claim 1, comprising a plurality of shim plates disposed between the hollow foot and the housing and between the housing and a nut on the screw-hook, said shim plates including apertures for passage of the screw-hook.

4. An outside rear-view mirror for motor vehicles, as claimed in claim 1, further comprising a base disposed below the hollow foot to seat onto the vehicle body, said base having an aperture for passage of the screw-hook.

5. An outside rear-view mirror for motor vehicles, comprising an approximately conical housing, a mirror-head mounted on said housing, a hollow foot for the housing, a pair of screw-hooks engaged with the housing and passed through the hollow foot and each having an eye to receive a sheet-metal screw for attachment thereof to a vehicle body, and a plate disposed beneath the eye of the screw-hooks and apertured to receive the sheet-metal screws and to serve for marking drilling positions on the vehicle body.

6. An outside rear-view mirror for motor vehicles, comprising an approximately conical housing, a mirror-head mounted on said housing, a hollow foot for the housing, a pair of screw-hooks engaged with the housing and passed through the hollow foot and each having an eye to receive a sheet-metal screw for attachment thereof to the vehicle body, and a spring wire securing clamp formed with eyes to receive and clamp the sheet-metal screws and serve as a gauge for drilling a vehicle body to receive said screws.

7. An outside rear-view mirror for motor vehicles, comprising an approximately conical housing, a mirror-head mounted on said housing, a hollow foot for the housing, a screw-hook engaged with the housing and passed through the hollow foot and having an eye to receive a sheet-metal screw for attachment thereof to a vehicle body, and a shim plate formed integrally with the foot and disposed in abutment with the housing, said shim plate being apertured for passage of the screw-hook.

8. An outside rear-view mirror for motor vehicles, comprising an approximately conical housing, a mirror-head mounted on said housing, a hollow foot for the housing, a screw-hook engaged with the housing and passed through the hollow foot and having an eye to receive a sheet-metal screw for attachment thereof to a vehicle body, and a shim plate disposed within and combined in assembly with the housing, said shim plate including an aperature for passage of the screw-hook.

References Cited by the Examiner

UNITED STATES PATENTS

| | | | |
|---|---|---|---|
| 2,710,161 | 6/1955 | Haberstump | 248—203 |
| 2,775,919 | 1/1957 | Fischer | 88—98 |
| 3,214,578 | 10/1965 | Talbot | 240—4.2 |

CLAUDE A. LE ROY, *Primary Examiner.*

K. J. WINGERT, *Assistant Examiner.*